(12) United States Patent
Qin et al.

(10) Patent No.: US 10,392,540 B2
(45) Date of Patent: Aug. 27, 2019

(54) ADHESIVE COMPOSITION AND AN ARTICLE MANUFACTURED THEREFROM

(71) Applicant: 3M INNOVATIVE PROPERTIES COMPANY, St. Paul, MN (US)

(72) Inventors: Liang Qin, Shanghai (CN); Zhenqian Yang, Shanghai (CN); Dong Li, Shanghai (CN); Ping Zhou, Shanghai (CN); Qunying Liu, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/752,791

(22) PCT Filed: Sep. 15, 2015

(86) PCT No.: PCT/CN2015/089604
§ 371 (c)(1),
(2) Date: Feb. 14, 2018

(87) PCT Pub. No.: WO2017/045120
PCT Pub. Date: Mar. 23, 2017

(65) Prior Publication Data
US 2018/0237669 A1    Aug. 23, 2018

(51) Int. Cl.
*C09J 163/00* (2006.01)
*C08L 63/00* (2006.01)
*C09J 167/02* (2006.01)
*C09J 11/04* (2006.01)
*C09J 11/06* (2006.01)
*C08L 67/02* (2006.01)

(52) U.S. Cl.
CPC ............. *C09J 163/00* (2013.01); *C08L 63/00* (2013.01); *C08L 67/02* (2013.01); *C09J 11/04* (2013.01); *C09J 11/06* (2013.01); *C09J 167/02* (2013.01)

(58) Field of Classification Search
CPC ........ C09J 163/00; C09J 167/02; C09J 11/04; C09J 11/06; C08L 63/00; C08L 76/02
See application file for complete search history.

(56) References Cited

U.S. PATENT DOCUMENTS

| 5,162,140 A | 11/1992 | Taniguchi |
| 2002/0182955 A1 | 12/2002 | Weglewski |
| 2013/0137796 A1 | 5/2013 | Kropp |

FOREIGN PATENT DOCUMENTS

| CN | 101851480 | 10/2010 |
| CN | 101040025 | 6/2011 |
| CN | 101418205 | 5/2012 |
| CN | 102079956 | 6/2012 |
| CN | 102010569 | 7/2012 |
| CN | 102226033 | 10/2012 |
| CN | 101747587 | 11/2012 |
| CN | 102190865 | 12/2012 |
| CN | 104293104 | 1/2015 |
| JP | S54-003135 A | 1/1979 |
| JP | S64-008698 A | 1/1989 |
| JP | 2013-097195 A | 5/2012 |
| JP | 2015-010098 A | 1/2015 |

OTHER PUBLICATIONS

International Search Report for PCT International Application No. PCT/CN2015/089604, dated Jun. 16, 2016, 3pgs.

*Primary Examiner* — Michael C Miggins
(74) *Attorney, Agent, or Firm* — Janet A. Kling

(57) ABSTRACT

The present disclosure relates to a B-stageable adhesive composition and a coating prepared by the same. In the present disclosure, the adhesive composition comprises the following components in solid content percentage: (A) 15% to 50% by weight of a first epoxy resin with a weight average molecular weight Mw of 8,000 g/mol or more; (B) 3% to 15% by weight of a second epoxy resin with a weight average molecular weight Mw of 200 to 2,000 g/mol; (C) 20% to 50% by weight of a carboxyl terminated polyester or derivates thereof; (D) 0.1% to 2.5% by weight of a first curing agent capable of reacting with epoxy group; (E) 0.1% to 2.5% by weight of a second curing agent capable of reacting with carboxyl group; and (F) 0% to 40% by weight of a flame retardant. The coating obtained from the adhesive composition of the present disclosure shows good adhesion strength, heat resistance and functional properties such as flame retardance and prolonged shelf life.

20 Claims, No Drawings

ADHESIVE COMPOSITION AND AN ARTICLE MANUFACTURED THEREFROM

TECHNICAL FIELD

The present disclosure relates to an epoxy adhesive composition and an article manufactured from the adhesive composition. More specifically, the present disclosure relates to a B-stageable epoxy adhesive composition and a B-stageable article manufactured therefrom which has a balance of adhesion strength, heat resistance and other properties such as flame retardance and prolonged shelf life.

BACKGROUND ART

Along with the development of new markets and industrial trend, the electrical devices and equipment become smaller, thinner, lighter and having high power density. High temperature rating insulation material becomes more and more important for the application of insulation protection in electrical market. The insulation tape with rubber based PSA or acrylic PSA is one key type of the insulation material for electrical device and equipment. Generally, the temperature rating of such materials are class B or below, and the thermal degradation of these materials at high temperature would result in a loss of adhesion and other performances.

CN102190865A discloses an adhesive composition for making a B stage sheet and printed circuit board (PCB), which comprises a bis-phenol A epoxy resin and bromine and dicyandiamide as curing agents.

CN102226033A discloses an adhesive composition for making a B stage sheet and composites laminated with aluminum foil. The composition contains an epoxy resin modified by polyurethane or polybutadiene, and contains amine and anhydride as curing agents.

CN101418205A provides a halogen-free flame retardant adhesive and application of the adhesive to prepregs and multilayer printed boards. The adhesive consists of resin, organic phosphorous flame retardant, inorganic filler, curing accelerator and a solvent, wherein the resin is a composition consisting of 40 to 60 portions of benzoxazine resin, 15 to 20 portions of phenolic novolac resin and 20 to 45 portions of epoxy pre-polymer in mass portion.

CN101747587A discloses a flame retardant resin composition. The composition contains 500 to 680 weight parts of phenolic resin modified by tong oil, 90 to 200 weight parts of epoxy resin, 50 to 120 weight parts of phosphor nitrile compound, 15 to 50 weight parts of phosphate fire retardant, and 1 to 50 weight parts of curing agent. U.S. Pat. No. 5,162,140 discloses a flexible printed circuit board (PCB) and an adhesive used therein, the adhesive is used to promote the hardening of the binder and it may contain Lewis acid salts as catalyst component.

SUMMARY OF THE INVENTION

In the present disclosure, a B-stageable epoxy adhesive composition is developed to provide a better solution for bonding in the field of requiring good adhesion strength, heat resistance and functional properties such as flame retardance and prolonged shelf life.

In an aspect, the present disclosure provides an adhesive composition, based on the total weight of the composition, comprising the following components in solid content percentage:

(A) 15% to 50% by weight of a first epoxy resin with a weight average molecular weight Mw of 8,000 g/mol or more;
(B) 3% to 15% by weight of a second epoxy resin with a weight average molecular weight Mw of 200 to 3,000 g/mol;
(C) 20% to 50% by weight of a carboxyl terminated polyester or derivates thereof;
(D) 0.1% to 2.5% by weight of a first curing agent capable of reacting with epoxy group;
(E) 0.1% to 2.5% by weight of a second curing agent capable of reacting with carboxyl group; and
(F) 0% to 40% by weight of a flame retardant;
the sum of components of the composition is equal to 100% by weight.

According to another aspect of the present disclosure, a coating formed by the adhesive composition is provided.

According to another aspect of the present disclosure, an article comprising a substrate and a coating is provided.

According to another aspect of the present disclosure, a method for preparing the coating is provided, and the method comprises the step of mixing all the components of the adhesive composition according to the present disclosure.

According to another aspect of the present disclosure, a method for preparing the article is provided, and the method comprises the step of applying the coating according to the present disclosure onto a surface of a substrate.

For the purpose of developing an adhesive composition with good adhesion strength, heat resistance, and functional properties such as flame retardance and potential prolonged shelf life, especially the balance among these properties, each component and essential additives should be chosen to achieve a compatible results on the properties. For example, epoxy resin was widely used as the main component in an adhesive composition, due to its good adhesion strength. However, the processability, heat resistance, flame retardance and even the cost also should be considered during the development of the adhesive. There is a variety of epoxy resin commercially available which has various chemical structures and molecular weight. While applying an epoxy resin to an adhesive composition, the flexibility or toughness of the cured epoxy resin coating must be considered in addition to the adhesion strength of the coating. In order to improve the toughness, various tougheners were developed for adding into the adhesive composition system. Polyester is one of the toughener as used in the epoxy adhesive composition because of the good behaviors and the effect-economic cost. In another aspect, in order to provide flame retardance, known flame retardants were developed for adding into the adhesive composition system. Moreover, the shelf life of the adhesive composition per se and/or the article comprising the cured adhesive composition, such as an adhesive tape, also is important to be considered. However, as mentioned above, the balance of properties must be achieved to provide an effect adhesive composition, which is characterized by each component and the amount thereof.

DETAILED DESCRIPTION OF THE INVENTION

It shall be understood that one skilled in the art can contemplate other various embodiments and make modifications thereto according to the teachings of the description without departing from the scope or spirit of the present disclosure. Therefore, the following embodiments are not intended to be limiting in any sense.

Unless otherwise specified, it shall be understood that all numbers which are used in the description and claims to represent feature sizes, quantities and physicochemical characteristics are modified by the term "approximate" in all cases. Therefore, unless otherwise oppositely stated, numerical parameters which are listed in the description and claims attached thereto are approximate values. One skilled in the art can properly change these approximate values according to the teachings disclosed herein so as to obtain desired characteristics. Numerical ranges which are expressed by using end points shall include all numbers and any range therein. For instance, the range 1-5 includes 1, 1.1, 1.5, 2, 1.75, 3, 3.80, 4, and 5, etc.

Unless otherwise specified, it shall be understood that, the expression "in solid content percentage" refers to the percentage of a component in the composition in solid content basis, i.e. the solvent contained in the adhesive composition is excluded. Moreover, all percentages used herein refer to weight percentages which are based on the total weight of the adhesive composition.

Unless otherwise specified, it shall be understood that the expression "B-stageable" refers to the adhesive and the composite with two steps curing reaction, the first step complete in the oven on line or by post cure, the second step complete in the heat lamination process.

The components as used in the present disclosure will be described in detail below.

(A) The First Epoxy Resin

The first epoxy resin with a high molecular weight is contained in the adhesive composition to provide a coating obtained from the adhesive composition with good adhesion strength and heat resistance. In addition, the first epoxy resin imparts the coating with essential mechanical strength and rigidity.

In an aspect, the first epoxy resin used in the present disclosure has a weight average molecular weight Mw of 8,000 g/mol or more, advantageously 10,000 g/mol or more, advantageously 12,000 g/mol or more, advantageously 15,000 g/mol or more, advantageously 20,000 g/mol or more, and advantageously 25,000 g/mol or more.

In another aspect, the first epoxy resin used in the present disclosure may have an epoxide equivalent weight of about 4,000 g/eq or more, advantageously about 5,000 g/eq or more, advantageously about 6,000 g/eq or more, advantageously about 7,500 g/eq or more, and advantageously about 10,000 g/eq or more.

According to certain embodiments, the first epoxy resin can be selected from the group consisting of bisphenol A-type epoxy resins, brominated bisphenol A-type epoxy resins, bisphenol F-type epoxy resins, bisphenol AD-type epoxy resins, novolac epoxy resin, trisphenolmethane epoxy resin, glycidylamine epoxy resin, aminophenol epoxy resin, naphthalene epoxy resin, epoxy resins containing a fluorene ring, cycloaliphatic glycidyl ether-type epoxy resins, cycloaliphatic glycidylamine-type epoxy resins, and cycloaliphatic glycidyl ester-type epoxy resins. Preferably, the first epoxy resin can be selected from the group consisting of bisphenol A-type epoxy resins, brominated bisphenol A-type epoxy resins, bisphenol F-type epoxy resins, bisphenol AD-type epoxy resins, novolac epoxy resin and the combination thereof. For example, a bisphenol A-type epoxy resin is formed from reacting two moles of epichlorohydrin with one mole of bisphenol A to form the bisphenol A diglycidyl ether.

The use of these epoxy resins allows a uniform three-dimensional network structure to be formed after being cured, and also allows heat resistance and adhesion strength to be imparted to the coating obtained from the adhesive composition after be cured.

With respect to the amount of the first epoxy resin in the adhesive composition, based on the total weight of the composition, the solid content of the first epoxy resin is in a range of 15-50% by weight, advantageously 20-45% by weight, advantageously 25-40% by weight, advantageously 25-35% by weight, and advantageously 30-35% by weight. In the case that the first epoxy resin was used in the above amount range and in combination with the second epoxy resin together with the tougheners, a good balance of adhesion strength and heat resistance will be achieved for the adhesive composition and also the obtained adhesive composition is economy-effective.

(B) The Second Epoxy Resin

The second epoxy resin with a low molecular weight is contained in the adhesive composition to provide the cross-linking capability and adhesion of the coating obtained from the adhesive composition after being cured. That is, without the second epoxy resin, the coating obtained from the adhesive composition will has somewhat poor crosslinking capability and low adhesion strength under stress, especially at a high temperature.

According to certain embodiments, the second epoxy resin can be selected from the group consisting of an epoxy oligomer or an epoxy polymer with a weight average molecular weight Mw of about 200 to 3,000 g/mol, advantageously 400 to 2,000 g/mol, advantageously 800 to 2,000 g/mol, and advantageously 1,000 to 1,500 g/mol.

According to certain embodiments, the second epoxy resin has an epoxide equivalent weight of 100 g/eq to 1500 g/eq, advantageously 100 g/eq to 1000 g/eq, advantageously 100 g/eq to 800 g/eq, and advantageously 100 g/eq to 400 g/eq. When the second epoxy resin having the above epoxide equivalent weight, the coating obtained from the adhesive composition can be effectively cured with good adhesion strength and high heat resistance.

According to certain embodiments, the second epoxy resin with a glass transition temperature Tg of 30° C. or less is preferably used in the present adhesive composition. If the glass transition temperature Tg of the second epoxy resin is 30° C., or less, it might provide an additional advantage of good balance on adhesion and heat resistance.

According to certain embodiments, the second epoxy resin can be selected from modified epoxy resins. For example, polyurethane (PU) modified epoxy resin including polyurethane modified bisphenol A epoxy resins, polyurethane modified bisphenol F epoxy resin, polyurethane modified novolac epoxy resins, polyurethane modified trisphenolmethane epoxy resin, polyurethane modified glycidylamine epoxy resins, polyurethane modified aminophenol epoxy resins, polyurethane modified naphthalene epoxy resins are preferably used in the present adhesive composition.

According to certain embodiments, based on the total weight of the adhesive composition, the solid content of the second epoxy resin is in a range of 3-15% by weight, advantageously 4-15% by weight, advantageously 5-12% by weight, advantageously 6-10% by weight, and advantageously 7-10% by weight.

The combination of component (A) and (B) is also called as a two-component epoxy resin system according to the present disclosure. According to certain embodiments, the present adhesive composition preferably comprises the combination of a bisphenol epoxy resin with a high molecular weight and a polyurethane modified bisphenol epoxy resin with a low molecular weight as the two-component epoxy resin system. According to certain embodiments, the weight ratio of the first epoxy resin to the second epoxy resin is in a range of 10:1 to 2:1, preferably 8:1 to 3:1, preferably 8:1 to 4:1, in a solid content basis. If weight ratio of the first epoxy resin to the second epoxy resin is in the above range, it might provide an additional advantage of good balance on the adhesion strength and heat resistance.

(C) The Toughener Polyester

In the present disclosure, a carboxyl terminated polyester or derivates thereof is contained in the adhesive composition as a toughener to further balance the adhesion strength and heat resistance of a coating obtained from the adhesive composition after being cured. The toughener has functional groups which under the conditions of the curing reaction especially under high temperature and pressure, can react with the epoxy resin so as to improve the adhesive oozing and heat resistance of the coating formed by curing.

According to certain embodiments, the carboxyl terminated polyester or derivates thereof according to the present disclosure is also capable to react with the active curing agent in the epoxy adhesive composition so as to prevent or avoid the reaction between the epoxy resins and the active curing agent during storage of the adhesive composition and storage of the B-stage cured articles. Therefore, the shelf life of the adhesive composition or the B-stageable articles can be well protected. For example, the B-stageable articles such as an adhesive tape can be stored for more than one year under room temperature without losing the high adhesion strength and high heat resistance thereof.

According to certain embodiments, the carboxyl terminated polyester has a weight average molecular weight Mw of about 1,000 g/mol or more, advantageously about 1,500 g/mol or more, and advantageously about 2,000 g/mol or more.

According to certain embodiments, the carboxyl terminated polyester with a glass transition temperature Tg of 30° C. or less is preferably used in the present adhesive composition.

According to certain embodiments, the carboxyl terminated polyester preferably has an acid value of 50-100 mg KOH/g, advantageously 60-90 mg KOH/g, advantageously 70-90 mg KOH/g, and advantageously 70-80 mg KOH/g.

The polyester comprises a dicarboxylic acid unit and a glycol unit, wherein the dicarboxylic acid unit preferably comprises one or more of succinic acid, adipic acid, cyclohexane diacid, suberic acid, phthalic acid, naphthalene acid, trimellitic acid, pyromellitic acid, and the glycol unit preferably comprises one or more ethylene glycol, propylene glycol, butanediol, pentanediol, hexanediol, octanediol, decanediol, diethylene glycol, dipropylene glycol, dimethylolpropane, and dimethylolethane. Preferably the polyester comprises an aromatic segment either in the dicarboxylic acid unit or in the glycol unit.

Among the carboxyl terminated polyester, phthalate polyester, adipate polyester, and carboxyl terminated butadiene nitrile rubber, carboxyl terminated butadiene rubber is more preferably used in the present adhesive composition.

With respect to the amount of the carboxyl terminated polyester in the adhesive composition, based on the total weight of the composition, the solid content of polyester is in a range of 20-50% by weight, advantageously 25-45% by weight, advantageously 25-40% by weight, advantageously 30-40% by weight.

Preferably the weight ratio of the carboxyl terminated polyester to the sum of the first and second epoxy resin is in a range of 0.3:1 to 2.0:1, preferably 0.5:1 to 1.8:1, preferably 0.6:1 to 1.6:1, preferably 0.7:1 to 1.5:1, preferably 0.8:1 to 1.2:1, preferably 0.8:1 to 1:1, in a solid content basis.

The polyester may be added into the present adhesive system in a bulk amount, for example, up to 50 weight % with respect to the total weight of the composition without impairing the adhesion strength and heat resistance. By using the polyester with carboxyl terminated groups and choosing the amount thereof, the improvement of toughness may be achieved and a balance between toughness and adhesion strength will be established.

(D) The First Curing Agent and (E) Second Curing Agent

In the present disclosure, a curing agent system is contained in the adhesive composition. And upon heat activation, epoxy groups of the epoxy resin will react with the curing agents thereby crosslinking the epoxy resin to obtain a cured coating.

The curing agent system comprises a first curing agent (D) and a second curing agent (E) according to the present disclosure, in which the first curing agent (D) is a latent curing agent which provides effective curing at elevated temperature and/or pressure, and the second curing agent (E) is an active curing agent which provides good adhesive cohesion and heat resistance upon curing at a relative lower temperature.

Preferably, the second curing agent (E) which is an active curing agent has the capability of reacting with the carboxyl terminated polyester. By choosing the second curing agent and controlling the amount thereof, the adhesive composition according to the present disclosure and the coating obtained from the composition can be imparted with additional effects on the prolonged shelf time without losing the adhesive strength and heat resistance.

According to certain embodiments, the first curing agent (D) can be selected from the group consisting of dicyandiamide, dihydrazide, amine-based curing agent, acid anhydride-based curing agent, imidazole compound, borofluoride, octoate salt, their encapsulate, and the combination thereof. Preferably the first curing agent (D) can be selected from the group consisting of amine-based curing agent and an acid anhydride-based curing agent. As an amine-based curing agent, for example, aromatic amines such as diaminodiphenylmethane or diaminodiphenyl sulfone, aliphatic amines, imidazole derivatives, dicyandiamide, tetramethylguanidine, and/or thiourea-added amine may be used in the present adhesive system.

The first curing agent (D) has the functional group which is capable of reacting with epoxy group of the epoxy resin, preferably at elevated temperature e.g., above 120° C. The period of curing reaction is generally several minutes to several hours according to the specific curing agent. The first curing agent (D) may be commercial available and a skilled person will understand the condition of the curing reaction according to the instruction of the curing agent.

According to certain embodiments, the second curing agent (E) can be selected from the group consisting of bisamide, amine, imide, epoxy compound and the combination thereof According to certain embodiments, bisamide is more preferred used in the present adhesive system. The second curing agent (E) is an active curing agent has the capability of reacting with the carboxyl terminate group of the toughener. The curing reaction will occur on-line and lasts several minutes to several hours, e.g, 2 or 3 hours at about 70° C.

With respect to the amount of curing agent in the adhesive composition, based on the total weight of the adhesive composition, the sum of the first curing agent and the second curing agent is in a range of 0.1%-5% by weight, advantageously 0.4%-3% by weight, advantageously 0.4%-2% by weight, and advantageously 0.5%-1.0% by weight. Herein, the content of the first curing agent in the adhesive composition is in a range of 0.1%-2.5% by weight, advantageously 0.2%-1.5% by weight, advantageously 0.3%-1% by weight, and advantageously 0.3%-0.5% by weight; and the content of the second curing agent in the adhesive composition is in a range of 0.1%-2.5% by weight, advantageously 0.2%-1.5% by weight, advantageously 0.2%-1% by weight, and advantageously 0.2%-0.5% by weight. When the first curing agent and the second curing agent are contained in the adhesive composition in the amount of the above range, the coating obtained from the adhesive composition will have an effective curing capability at elevated temperature, a long shelf life and in the meanwhile good adhesion strength and heat resistance.

Additionally, the adhesive composition may optionally comprises a curing catalyst, for example, comprises 0 to 1% by weight of a curing catalyst such as urea, imidizole, quaternary ammonium salt, quaternary ammonium polymer and the mixture thereof.

(F) Flame Retardant

In the present disclosure, a flame retardant may be contained in the adhesive composition so as to endow the articles obtained from the adhesive composition with excellent flame retardance. Preferably the flame retardant is a halogen-free flame retardant taking consideration of the environmental issue. The flame retardant which can be used in the present disclosure is selected from organic flame retardant and inorganic flame retardant, such as aluminum hydroxide, magnesium hydroxide, MgO, ZnO, organophosphorus salt, phosphate, phosphorus containing polymer or nitrogen containing polymer or their hybrid.

Among the above, phosphate in particular triphenyl phosphate has excellent flame retardance and self-extinguishing properties resulting from phosphorus atoms contained therein and are therefore widely used as flame retardants for various resins.

In the present disclosure, the present inventor found that the flame retardant (for example, the combination of triphenyl phosphate and aluminum hydroxide) realizes efficient flame retardance effect, without impairing the other desired properties e.g. adhesion strength and heat resistance, even if the content of the flame retardant accounts for more than 20% of the total weight of the composition. Therefore, the flame retardant may be added into the present adhesive composition in a big bulk, for example, up to 40% by weight, based on the total weight of the composition.

In an aspect, for the purpose of providing effective flame retardance without impairing the desired properties of the adhesive composition, the content of the flame retardant in the adhesive composition is in a range of 5%-40% by weight, advantageously 10%-35% by weight, advantageously 20%-35% by weight, and advantageously 20%-30% by weight.

The adhesive composition according to the present disclosure achieved a beneficial balance among the adhesive strength, heat resistance, flame retardance and flexibility. In addition, the present adhesive composition is economy-effective because the components with a low cost such as polyester and flame retardant are comprised in the composition in a bulk amount and the component with a high cost such as epoxy resin is reduced in the amount in the composition. Furthermore, the inventor found that the adhesive composition according to the present disclosure has a long shelf life and keep stable upon store at normal environment and even in harsh environment.

Additives

In addition to the above components, the adhesive composition of the present disclosure may comprise one or more of the following components, such as fillers, solvents, antioxidants, antifoaming agents, pigments, and surfactant.

When necessary, the fillers can be contained in the adhesive composition to modify or improve the properties of the adhesive composition, in which the fillers can be selected from conductive filler such as carbon black, Nickel powder, Copper powder, golden power, silver powder; thermal conductive filler such as boron nitride (BN), aluminum hydride (ATH); or other fillers such as $CaCO_3$, $SiO_2$, clay, chalk, glass fibers and so on.

According to certain embodiments, the solvent can be further contained in the adhesive composition to dissolve the related components e.g. epoxy resin, toughener, the curing agent and other additives, and help to disperse the flame retardant and fillers. According to certain embodiments, the solvent can be selected from the group consisting of N,N-Dimethyl formamide, methyl ethyl ketone, aliphatic solvent such as hexane, heptane and cyclohexane; aromatic solvent such as toluene and xylene.

According to certain embodiments, an antioxidant can be further contained in the adhesive composition to provide an advantage of better aging performance. According to certain embodiments, the antioxidant can be selected from the group consisting of tea polyphenols, Vitamin E, flavonoid, Butylated hydroxyanisole, Butylated hydroxytoluene, tert-Butyl hydroquinone. According to certain embodiments, based on the total weight of the adhesive composition, the solid content of the antioxidant is 0.1-5%, preferably 0.5-3%.

According to certain embodiments, an antifoaming agent can be further contained in the adhesive composition to provide an advantage of good coating surface. According to certain embodiments, the antifoaming agent can be selected from the group consisting of insoluble oils, polydimethylsiloxanes and other silicones, certain alcohols, stearates and glycols. According to certain embodiments, based on the total weight of the adhesive composition, the solid content of the antifoaming agent is 0.01~1%, preferably 0.1~0.5%.

According to certain embodiments, a pigment can be further contained in the adhesive composition to provide an advantage of color of the coating. According to certain embodiments, the pigment can be selected from the group consisting of carbon black, ivory black, Cadmium pigments, Chromium, Cobalt pigments, Copper, Iron oxide, Lead pigments, Manganese pigments, Mercury pigments, Titanium pigments, Zinc pigments. According to certain embodiments, based on the total weight of the adhesive composition, the solid content of the pigment is 0.1~20%, preferably 3~10%.

According to certain embodiments, a surfactant can be further contained in the adhesive composition to provide an advantage of good surface of the coating. According to certain embodiments, the surfactant can be selected from the group consisting of sulfate, sulfonate, phosphate, ammonium lauryl sulfate, sodium lauryl sulfate (SDS, sodium dodecyl sulfate) and the related alkyl-ether sulfates sodium laureth sulfate, also known as sodium lauryl ether sulfate (SLES), and sodium myreth sulfate. According to certain embodiments, based on the total weight of the adhesive composition, the solid content of the surfactant is 0.01~5%, preferably 0.1~3%.

In the present disclosure, the above mentioned components may be mixed together with solvents to form a one-component package with long shelf life. And the obtained adhesive composition may be applied to the surface of a device such as electronic device by commonly known coating methods and then be cured to provide an effective adhesion. Alternatively, the adhesive composition may be applied to the surface of a substrate such as a sheet, a film, a plate, a tape and then be dried to provide a B-stageable article, such as an adhesive tape. The B-stageable article can be stored at a normal environment in a package or in a rolling form and also has a long shelf life. Upon application, the B-stageable article may be applied to the devices and be further cured at a relatively high temperature and optional pressure to provide a completely cured article with heat resistance and flame retardance.

Therefore, the present disclosure also relates to an B-stageable article comprising a coating obtained from the adhesive composition after being actively cured. Preferably the B-stageable article is an adhesive tape, and in particular a B-stageable insulation tape. Also the present disclosure relates to an article which is a B-stageable insulation tape with a substrate such as a PET film, PI film, PEN film, Paper, fabric, nonwoven, polyaramid film or metal foil.

In a further aspect, the article has the following structures: the coating obtained from the adhesive composition of the present disclosure being disposed on a liner; the coating obtained from the adhesive composition of the present disclosure being disposed between a liner and a backing; a first coating obtained from the adhesive composition of the present disclosure being disposed on a liner, and then a backing and a second coating obtained from the adhesive composition of the present disclosure being disposed in sequence; and a backing being interposed between a first coating and a second coating.

The present disclosure further relates to a method for producing a B-stageable article, which comprises mixing the components of the composition of the present disclosure; and coating the obtained mixture onto a substrate, followed by drying the coated substrate. In an aspect, the substrate is a PET film. The coated substrate is dried at a temperature of 120° C. or less for a period of time allowing to from a B-stageable article, such as several minutes to several hours.

According to certain embodiments, the coating can be applied onto the surface of the substrate under a condition of under 25° C.

The present disclosure further relates to use of the adhesive composition or the article according to the present disclosure in insulation application for electrical devices which comprise battery, collector, PCB, bus bar and transformer and so on.

EXAMPLES

Hereinafter, the present disclosure is further described with reference to the following examples and comparative examples, which are provided in the present disclosure for illustrative purpose and are not for limiting the scopes of the present disclosure.

Raw Materials

The Raw materials used in the following illustrative examples of the present disclosure were commercial available and were listed in the following Table 1 by the trade name, chemical name and the vendor.

TABLE 1

Raw materials

| Trade name | Chemical name | Vendor name |
| --- | --- | --- |
| 40AX | Bisphenol A epoxy resin, epoxide equivalent weight >5000 g/eq, Mw of about 10000 g/mol, with a solid content of 40% | Shandong Shengquan, chemical co., Ltd |
| 301 | Bisphenol A epoxy resin with an epoxide equivalent weight of 3000 g/eq, Mw of about 6000 g/mol, with a solid content of 100% | Anhui Shengjian new materials CO., Ltd |
| ERS 133 | PU modified Epoxy resin, epoxide equivalent weight of 184~190 g/eq, Mw of about 400 g/mol, with a solid content of 100% | Shanghai ZhongSi industrial co., Ltd |
| DER671 | Bisphenol A epoxy resin, epoxide equivalent weight of 491 g/eq, Mw of about 800 g/mol, with a solid content of 100% | DOW Chemical(China) Investment Co., Ltd |
| Dicy | Dicyandiamide | Bayer MaterialScience LLC |
| 1054 | Bisamide | 3M |
| 3D | A carboxyl terminated polyester | Anhui Shengjian new materials CO., Ltd |
| TPP | Triphenyl Phosphate | Jiangsu Changhe Chemical Co., Ltd., China |
| ATH | Aluminum hydroxide | Shanghai Hengmu industrial development Co., Ltd |
| Polyethylene terephthalate film | Thickness: 125 um | Dupont Hongji Films Foshan Co., Ltd. |

Test Methods

The adhesion strength of the coating was evaluated by a "peel strength test" (T-peel strength at 25° C. and 105° C., respectively), the flame retardance of the coating was evaluated by a "flame retardant test", and the heat resistance of the coating was evaluated by adhesive oozing in "adhesive flow test".

Peel Strength Test

Peel strength test (T-peel strength) was conducted to evaluate the adhesion strength of the coating obtained from the adhesive composition. The test method of peel strength was referred to "ASTM D1876", which was a commonly used test method in the art. The test samples were made by hot lamination (160° C., 0.7 MPa, 30 min). In the above peel strength test, T-peel in 50 mm/min was employed to the test samples. The T-peel strength at 25° C. evaluated the peel strength of the coating at 25° C. according to the following standards was shown in Table 2-1.

TABLE 2-1

| T-peel strength at 25° C. (N) | Peel strength of the coating at 25° C. |
|---|---|
| ≥20 | Acceptable |
| ≥25 | Good |
| ≥30 | Excellent |

The T-peel strength at 105° C. evaluated the peel strength of the coating at 105° C. according to the following standards was shown in Table 2-2.

TABLE 2-2

| T-peel strength at 105° C. (N) | Peel strength of the coating at 105° C. |
|---|---|
| ≥15 | Acceptable |
| ≥18 | Good |
| ≥20 | Excellent |

Flame Retardant Test

The test method of flame retardant referred to "UL 94", which was a common test method in the art. In the above flame retardant test, the coating should pass a level of UL VTMO.

Heat Resistance

Adhesive flow test was conducted to evaluate the heat resistance of the coating obtained from the adhesive composition. The test method of flow property referred to "IPC-TM-650, No. 2.3.17.1", which was a common test method in the art for evaluating the flow property.

In the above adhesive flow test, the width of the adhesive which flows out after hot lamination (170° C., 0.7 MPa, 30 min) which was indicated as Oozing value was measured according to the following standards showed in Table 2-3.

TABLE 2-3

| Adhesive oozing (mm) | Heat resistance |
|---|---|
| ≤2 | Acceptable |
| ≤0.2 | Good |
| 0 | Excellent |

Accelerating Test

Accelerating test was conducted to simulate the shelf life of the coating obtained from the adhesive composition.

The accelerating test comprised the following step 1, step 2, and step 3.

Step 1: place the specimen at 80° C. for 7 days to predict one year shelf life

Step 2: get out the specimen from the oven after step 1 and dwell 24 hrs under 20° C. and 50% RH.

Step 3: test the adhesion strength according to T-peel test method as described above .

The retention of adhesion strength in Step 3 is more than 50%.

In the above accelerating test, a shelf life of the coating was measured according to the following standards showed in Table 2-4.

TABLE 2-4

| T-peel strength at 20° C. (N) | Shelf life |
|---|---|
| ≥15 | Acceptable |
| ≥18 | Good |
| ≥20 | Excellent |

Dielectric Strength Test

Dielectric strength test was conducted to evaluate the insulation capability of the coating obtained from the adhesive composition and the film. The test method of dielectric strength referred to "ASTM D149", which was a common test method in the art for evaluating the dielectric strength.

In the above dielectric strength test, dielectric breakdown voltage was measured according to the following standards showed in Table 2-5.

TABLE 2-5

| Dielectric breakdown voltage | Dielectric strength |
|---|---|
| >12 KV | Pass |

Example E1-E18

The adhesive was prepared by the following steps using the components and amounts as listed in Table 3:

Step 1: The first epoxy resin, the second epoxy resins and polyester toughener were added and dissolved in the second solvent (methyl ethyl ketone, MEK) to obtain a first solution;

Step 2: The first curing agent was added and dissolved in the first solvent (dimethyl formamide, DMF) to obtain a second solution;

Step 3: The first solution and the second solution was mixed together to obtain the third solution;

Step 4: The flame retardant and the second curing agent were added into the third solution and stirred under the room temperature to obtain an adhesive mixture.

A adhesive tape was prepared by the following steps :

Step 1: The above adhesive mixture was applied onto the surface of the PET film by blade-coating;

Step 2: The coated PET film was dried in an oven for ten minutes at a temperature 110° C. The dried coatings had a thickness of about 30 μm with solvent residue less than 0.1% wt;

Step 3: The tape was optionally applied with a releasable film on the surface;

The adhesion strength, flame retardance and heat resistance of the coating were measured according to the test methods as described above respectively. The test results are shown in Table 4.

Comparative Example C1-C5

The adhesive in the comparative examples C1 to C5 was prepared by the same method as above using the components and amounts as listed in Table 5. The test results are shown in Table 6.

TABLE 3

| Lot: | 1st epoxy 40AX | 1st epoxy 301 | 2nd epoxy ERS133 | 2nd epoxy DER671 | 1st curing agent Dicy | 2nd curing agent 1054 | Toughner 3D | Flame retardant TPP | Flame retardant ATH | Solvent MEK | Solvent DMF |
|---|---|---|---|---|---|---|---|---|---|---|---|
| E1 | 100 | | 10 | | 0.5 | 0.4 | 42 | 9 | 21 | 6 | 6 |
| E2 | 50 | | 10 | | 0.5 | 0.4 | 42 | 9 | 21 | 6 | 6 |
| E3 | 150 | | 10 | | 0.5 | 0.4 | 42 | 9 | 21 | 6 | 6 |

TABLE 3-continued

| Lot: | 1st epoxy 40AX | 1st epoxy 301 | 2nd epoxy ERS133 | 2nd epoxy DER671 | 1st curing agent Dicy | 2nd curing agent 1054 | Toughner 3D | Flame retardant TPP | Flame retardant ATH | Solvent MEK | Solvent DMF |
|---|---|---|---|---|---|---|---|---|---|---|---|
| E4  | 100 |  | 5  |    | 0.5 | 0.4 | 42 | 9  | 21 | 6 | 6 |
| E5  | 100 |  | 15 |    | 0.5 | 0.4 | 42 | 9  | 21 | 6 | 6 |
| E6  | 100 |  |    | 10 | 0.5 | 0.4 | 42 | 9  | 21 | 6 | 6 |
| E7  | 100 |  | 10 |    | 0.2 | 0.4 | 42 | 9  | 21 | 6 | 6 |
| E8  | 100 |  | 10 |    | 0.8 | 0.4 | 42 | 9  | 21 | 6 | 6 |
| E9  | 100 |  | 10 |    | 0.5 | 0.2 | 42 | 9  | 21 | 6 | 6 |
| E10 | 100 |  | 10 |    | 0.5 | 0.6 | 42 | 9  | 21 | 6 | 6 |
| E11 | 100 |  | 10 |    | 0.5 | 1.0 | 42 | 9  | 21 | 6 | 6 |
| E12 | 100 |  | 10 |    | 0.5 | 0.4 | 36 | 9  | 21 | 6 | 6 |
| E13 | 100 |  | 10 |    | 0.5 | 0.4 | 60 | 9  | 21 | 6 | 6 |
| E14 | 100 |  | 10 |    | 0.5 | 0.4 | 80 | 9  | 21 | 6 | 6 |
| E15 | 100 |  | 10 |    | 0.5 | 0.4 | 42 | 6  | 21 | 6 | 6 |
| E16 | 100 |  | 10 |    | 0.5 | 0.4 | 42 | 12 | 21 | 6 | 6 |
| E17 | 100 |  | 10 |    | 0.5 | 0.4 | 42 | 9  | 18 | 6 | 6 |
| E18 | 100 |  | 10 |    | 0.5 | 0.4 | 42 | 9  | 24 | 6 | 6 |

TABLE 4

| Items | Adhesion strength | | Heat resistance adhesive oozing@170° C. &30 min | Dielectric strength | | Shelf life |
|---|---|---|---|---|---|---|
|  | T-peel@25° C. (N) | T-peel@105° C. (N) |  | Dielectric breakdown voltage | Flame retardant UL94 VTM0 | T-peel@20° C. (N) with 80° C.&7 Days |
| E1  | 32.39 | 21.3  | 0       | Pass | Pass | 22.67 |
| E2  | 27.5  | 20.1  | 0.2~2 mm | Pass | Pass | 17.88 |
| E3  | 34.2  | 31.6  | 0       | Pass | Pass | 25.65 |
| E4  | 37.5  | 23.03 | 0       | Pass | Pass | 26.25 |
| E5  | 36.8  | 26.35 | <0.2    | Pass | Pass | 22.08 |
| E6  | 31.37 | 26.4  | 0       | Pass | Pass | 21.96 |
| E7  | 36.4  | 19.6  | <0.2 mm | Pass | Pass | 25.48 |
| E8  | 32.77 | 21.9  | 0       | Pass | Pass | 18.02 |
| E9  | 34.11 | 21.2  | <0.2 mm | Pass | Pass | 23.88 |
| E10 | 27.66 | 19.5  | 0       | Pass | Pass | 22.13 |
| E11 | 21.66 | 16.5  | 0       | Pass | Pass | 17.33 |
| E12 | 28.29 | 22.8  | <0.2 mm | Pass | Pass | 19.80 |
| E13 | 34.19 | 31.6  | 0       | Pass | Pass | 23.93 |
| E14 | 46.74 | 26.2  | <0.2 mm | Pass | Pass | 30.38 |
| E15 | 32.77 | 21.9  | 0       | Pass | Pass | 24.58 |
| E16 | 28.19 | 18.37 | <0.2    | Pass | Pass | 18.32 |
| E17 | 32.83 | 24.2  | 0       | Pass | Pass | 21.34 |
| E18 | 27.53 | 20.1  | 0       | Pass | Pass | 17.34 |

TABLE 5

| Lot: | 1st epoxy 40AX | 1st epoxy 301 | 2nd epoxy ERS133 | 2nd epoxy DER671 | 1st curing agent Dicy | 2nd curing agent 1054 | Toughner 3D | Flame retardant TPP | Flame retardant ATH | Solvent MEK | Solvent DMF |
|---|---|---|---|---|---|---|---|---|---|---|---|
| C1 |     | 100 | 10 |  | 0.5 | 0.4 | 42  | 9 | 21 | 6 | 6 |
| C2 | 100 |     | 3  |  | 0.5 | 0.4 | 42  | 9 | 21 | 6 | 6 |
| C3 | 100 |     | 10 |  | 0   | 0.4 | 42  | 9 | 21 | 6 | 6 |
| C4 | 100 |     | 10 |  | 0.5 | 0   | 42  | 9 | 21 | 6 | 6 |
| C5 | 100 |     | 10 |  | 0.5 | 0.4 | 100 | 9 | 21 | 6 | 6 |

TABLE 6

| Items | Adhesion strength | | Heat resistance adhesive oozing@170° C.&30 min | Dielectric strength | | Shelf life |
|---|---|---|---|---|---|---|
|  | T-peel@25° C. (N) | T-peel@105° C. (N) |  | Dielectric breakdown voltage | Flame retardant UL94 VTM0 | T-peel@20° C. (N) with 80° C.&7 Days |
| C1 | 21.66 | 14.4 | 0     | Pass | Pass | 15.16 |
| C2 | 40.8  | 11.9 | 0     | Pass | Pass | 32.64 |
| C3 | 45.72 | 6.7  | >2 mm | Pass | Pass | 34.29 |
| C4 | 36.1  | 19.1 | >2 mm | Pass | Pass | 27.08 |
| C5 | 65.05 | 16.2 | >2 mm | Pass | Pass | 35.78 |

From the experimental data of Table 4, the adhesive obtained from the recipe of Table 3 (Examples E1 to E18) exhibited an acceptable balance between the adhesion strength, heat resistance, flame retardance and the shelf life. The adhesive may comprise the epoxy resin with high molecular weight in an amount of above 15% by weight in order to ensure an acceptable heat resistance. Also the adhesive may comprise the epoxy resin with low molecular weight in an amount of no more than 15% by weight. The combination of latent curing agent and active curing agent effectively achieve the curing of the coating. Furthermore, the toughener polyester may be added into the adhesive system in a bulk amount, for example, about 43 weight % in Example E13 and about 44 weight % in Example E14 without impairing the adhesion strength and heat resistance. Similarly the flame retardant may be added into the adhesive system without impairing the desired properties e.g. adhesion strength and heat resistance, even if the total content of the flame retardants accounts for more than 20% by weight.

From the experimental data of C1 in Table 6, the use of epoxy resin with a Mw of about 6,000 g/mol (the first epoxy resin 301) resulted in a lower adhesion strength at high temperature which actually means the obtained adhesive lose the adhesion strength at the environment with high temperature.

From the experimental data of C2 in Table 6, the insufficient amount of second epoxy resin also resulted in a lower adhesion strength at high temperature, although the adhesion strength at normal temperature is good enough. Therefore, the epoxy resin with a low Mw is essential in the adhesive system of the present invention and the amount thereof shall be more than 3 weight %.

From the experimental data of C3 and C4 in Table 6, the combination of latent curing agent and active curing agent is essential to achieve the object of the present invention. The absence of anyone of them will result in an insufficient curing reaction and then a bad adhesion strength and heat resistance.

From the experimental data of C5 in Table 6, the use of polyester toughener in a huge amount will deteriorate the heat resistance and the adhesion strength at high temperature. Therefore, the amount of toughener should be controlled although the toughener may be used in a relative bulk amount in the present adhesive system.

Although the present disclosure have been described with reference to a number of illustrative examples as explained above, it should be understood that numerous other modifications and examples can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An adhesive composition, based on the total weight of the composition, comprising the following components in solid content percentage:
   (A) 15% to 50% by weight of a first epoxy resin with a weight average molecular weight Mw of 8,000 g/mol or more;
   (B) 3% to 15% by weight of a second epoxy resin with a weight average molecular weight Mw of 200 to 3,000 g/mol;
   (C) 20% to 50% by weight of a carboxyl terminated polyester or derivates thereof;
   (D) 0.1% to 2.5% by weight of a first curing agent capable of reacting with epoxy group;
   (E) 0.1% to 2.5% by weight of a second curing agent capable of reacting with carboxyl group; and
   (F) 0% to 40% by weight of a flame retardant.

2. The adhesive composition according to claim 1, wherein the first epoxy resin is selected from the group consisting of bisphenol A epoxy resins, brominated bisphenol A epoxy resins, bisphenol F epoxy resins, bisphenol AD epoxy resins, novolac epoxy resin, trisphenolmethane epoxy resin, glycidylamine epoxy resin, aminophenol epoxy resin, naphthalene epoxy resin, epoxy resins containing a fluorene ring, cycloaliphatic glycidyl ether-type epoxy resins, cycloaliphatic glycidylamine-type epoxy resins, cycloaliphatic glycidyl ester-type epoxy resins, and the combination thereof.

3. The adhesive composition according to claim 1, wherein the first epoxy resin is present in the composition in an amount of 25% to 40% by weight, based on the total weight of the composition in a solid content percentage.

4. The adhesive composition according to claim 1, wherein the second epoxy resin has an epoxide equivalent weight of 100 to 1,000 g/eq.

5. The adhesive composition according to claim 1, wherein the second epoxy resin is selected from the group consisting of polyurethane modified bisphenol A epoxy resin, polyurethane modified bisphenol F epoxy resin, polyurethane modified novolac epoxy resin, polyurethane modified trisphenolmethane epoxy resin, polyurethane modified glycidylamine epoxy resin, polyurethane modified aminophenol epoxy resin, polyurethane modified naphthalene epoxy resin, and the combination thereof.

6. The adhesive composition according to claim 1, wherein the second epoxy resin is present in the composition in an amount of 6% to 10% by weight, based on the total weight of the composition in a solid content percentage.

7. The adhesive composition according to claim 1, wherein the polyester has a weight average molecular weight Mw of 1,000 g/mol or more.

8. The adhesive composition according to claim 1, wherein the polyester has an acid value of 50-100 mg KOH/g.

9. The adhesive composition according to claim 1, wherein the polyester comprises a dicarboxylic acid unit and a glycol unit, wherein the dicarboxylic acid unit comprises one or more of succinic acid, adipic acid, cyclohexane diacid, suberic acid, phthalic acid, naphthalene acid, trimellitic acid, pyromellitic acid, and the glycol unit comprises one or more of ethylene glycol, propylene glycol, butanediol, pentanediol, hexanediol, octanediol, decanediol, diethylene glycol, dipropylene glycol, dimethylolpropane, dimethylolethane.

10. The adhesive composition according to claim 1, wherein the polyester is present in the composition in an amount of 25% to 40% by weight, based on the total weight of the composition in a solid content percentage.

11. The adhesive composition according to claim 1, wherein the first curing agent is selected from the group consisting of dicyandiamide, dihydrazide, amine-based curing agent, acid anhydride-based curing agent, imidazole compound, borofluoride, octoate salt, their encapsulate, and the combination thereof.

12. The adhesive composition according to claim 1, wherein the second curing agent is selected from bisamide, amine, imide, epoxy compound and the combination thereof.

13. The adhesive composition according to claim 1, wherein the weight ratio of the first epoxy resin to the second epoxy resin is in a range of 10:1 to 2:1, in a solid content basis.

14. The adhesive composition according to claim 1, wherein the weight ratio of the polyester to the sum of the first and second epoxy resin is in a range of 0.3:1 to 2.0:1, in a solid content basis.

15. The adhesive composition according to claim 1, wherein the adhesive composition is a B-stageable adhesive composition.

16. The adhesive composition according to claim 1, wherein the flame retardant is selected from the group consisting of aluminum hydroxide, magnesium hydroxide, organophosphorus salt, phosphate, phosphorus containing polymer or nitrogen containing polymer or their hybrid, MgO, ZnO, and the combination thereof.

17. The adhesive composition according to claim 16, wherein the flame retardant is present in the composition in an amount of 10% to 35% by weight, based on the total weight of the composition in a solid content percentage.

18. An article comprising a substrate and a coating obtained from the adhesive composition formed on a surface of the substrate, wherein the adhesive composition, based on the total weight of the composition, comprises the following components in solid content percentage:
   (A) 15% to 50% by weight of a first epoxy resin with a weight average molecular weight Mw of 8,000 g/mol or more;
   (B) 3% to 15% by weight of a second epoxy resin with a weight average molecular weight Mw of 200 to 3,000 g/mol;
   (C) 20% to 50% by weight of a carboxyl terminated polyester or derivates thereof;
   (D) 0.1% to 2.5% by weight of a first curing agent capable of reacting with epoxy group;
   (E) 0.1% to 2.5% by weight of a second curing agent capable of reacting with carboxyl group; and
   (F) 0% to 40% by weight of a flame retardant.

19. The article according to claim 18, wherein the article is in a form of sheet, plate, tape, roll, film or tube.

20. The article according to claim 18, further comprising a liner, a backing and a second coating obtained from the adhesive composition according to any one of claims 1 to 17, in which the liner, the coating, the backing and the second coating are disposed in sequence.

* * * * *